I. W. VALANCE.
Trunk-Fastening.
No. 161,914. Patented April 13, 1875.
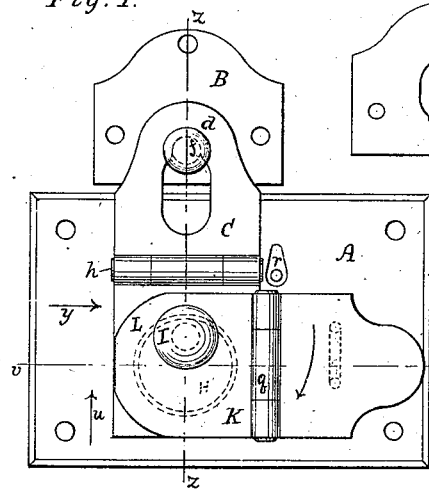
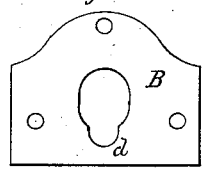
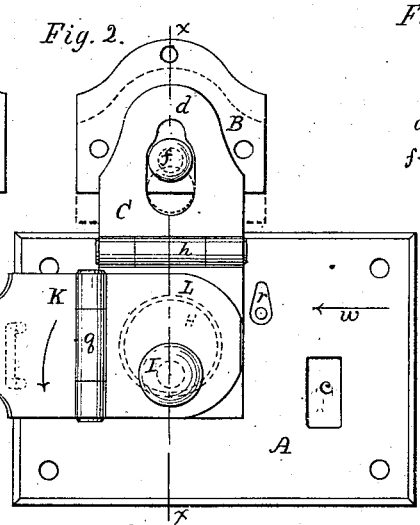
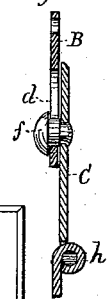
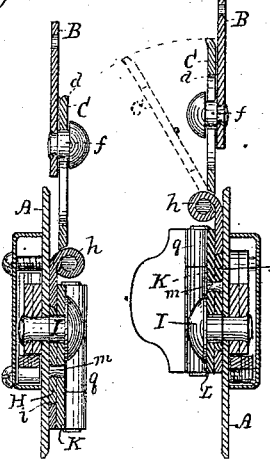
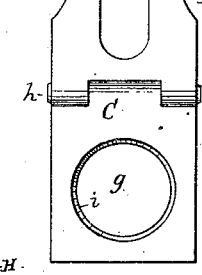
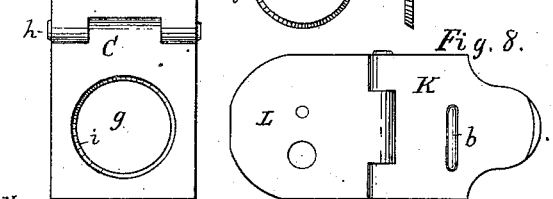
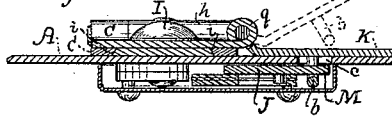
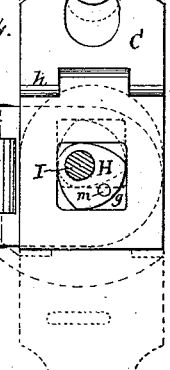
Witnesses:
Austin F. Park
James T. Goodfellow
Inventor:
Isaac W. Valance
THE GRAPHIC CO.PHOTO-LITH.39 & 41 PARK PLACE,N.Y.

UNITED STATES PATENT OFFICE.

ISAAC W. VALANCE, OF LANSINGBURG, NEW YORK.

IMPROVEMENT IN TRUNK-FASTENINGS.

Specification forming part of Letters Patent No. 161,914, dated April 13, 1875; application filed March 10, 1875.

*To all whom it may concern:*

Be it known that I, ISAAC W. VALANCE, of the village of Lansingburg, in the county of Rensselaer and State of New York, have invented certain new and useful Improvements in Trunk-Fastenings, of which the following is a specification, reference being had to the accompanying drawing.

The first part of this invention consists of a fastening-strap pivoted by or upon a cam or eccentric, which is pivoted upon a plate for or a part of the side of the body of a trunk, and which can be turned thereon in a plane parallel or nearly parallel thereto, and so as to thereby move the said fastening-strap into and out of engagement with a corresponding part of or for the lid of the trunk, substantially as hereinafter described.

Another part consists of the combination of a fastening-strap, pivoted by or upon a cam or eccentric, which is pivoted upon and so as to turn in a plane substantially parallel to the body part of a trunk, and thereby move the said fastening-strap into and out of engagement with the lid-piece, and an adjustable stop by means of which the said cam or eccentric can be secured so as to retain the said fastening-strap in engagement with the said lid-piece, substantially as hereinafter set forth.

Another part consists of the combination of a fastening-strap, with or without a hinge-joint therein, and pivoted by or upon a cam or eccentric which is pivoted so as to turn upon the body plate and thereby move the said fastening-strap into and out of engagement with the lid-piece, an arm or lever fast on the said cam or eccentric, and having a hinge-joint and a catch or staple arranged to enter and extend through an opening in the body plate when the fastening-strap is engaged with the lid-piece, and a locking-bolt, arranged and operated so as to be engaged with and released from the said catch or staple on the back side of the said body plate, all substantially as hereinafter set forth.

Another part consists of a certain construction of the combined fastening-strap, cam, or eccentric, and its cap-piece or lever-arm, whereby the same are secured together and pivoted to the body plate, substantially as hereinafter shown and described.

In the aforesaid drawing, Figure 1 is a front elevation of a trunk-fastening, which embodies all the aforesaid parts of this invention, with the fastening-strap engaged with the lid-piece. Fig. 2 is a front elevation of the same trunk-fastening, with the fastening-strap disengaged from the lid-piece. Fig. 3 shows a section of the same at the line $z\ z$ in Fig. 1, viewed in the direction pointed by the arrow $y$. Fig. 4 shows a section of the same at the line $x\ x$ in Fig. 2, seen in the direction of the arrow $w$. Fig. 5 shows a section of the same at the line $v\ v$ in Fig. 1, seen in the direction of the arrow $u$. Fig. 6 is a sectional elevation of the fastening-strap, the cam or eccentric with its cap-arm or lever, and the pivot-bolt of the same trunk-fastening, all combined ready to be attached to the body-plate. Fig. 7 is a rear view of the fastening-strap, and Fig. 8 is a rear view of the cam-lever of the trunk-fastening, shown in Figs. 1 and 2. Fig. 9 is a side elevation, and Fig. 10 an edge view, of the cam or eccentric in the same trunk-fastening, and Fig. 11 is a side view of the pivot-bolt of the same. Fig. 12 is a front view, and Fig. 13 is a section, showing a modification of the lid-piece and fastening-strap of the trunk-fastening, represented in Figs. 1 and 2. Fig. 14 is a rear view of the combined fastening-strap and pivoted cam or eccentric of the same trunk-fastening, modified in form. Fig. 15 is a front view, and Fig. 16 a cross section at or about the line $t\ t$, of a trunk-fastening which embodies the first, second, and fourth aforesaid parts of this invention. Fig. 17 is a front elevation, and Fig. 18 is a section at the line $s\ s$, of a trunk-fastening that embraces only the first and second aforesaid parts of this invention.

Like parts are marked by like letters in the different figures.

A is a plate or part which may be of any suitable form, and which is to be attached to or form a portion of the side of the body of a trunk, and B is the part which is to be attached to or form a portion of the corresponding side of the lid of the trunk, or, if desired, the part A may be on the lid, and the part B on the body. C is a fastening-strap of metal, which has at its upper part a loop, d, or a hook, e, Figs. 15 and 17, suitable for engagement with and disengagement from a corresponding headed stud, f, fastened on or forming a part of the lid-piece B, or the stud f may be on the fastening-strap, and the loop or hook on the lid-piece, as indicated by Figs. 12 and 13.

The fastening-strap C has, through its lower part, an aperture or socket, g, which surrounds the cam or eccentric H, which is pivoted by or upon the stud I that is fast to the body part A, so that the said cam or eccentric can be turned to and fro on that pivot-stud, and within the socket g of the fastening-strap, so as to move the latter into engagement with the stud f of the lid-piece, as represented in full lines in Figs. 1, 3, 14, 15, 16, 17, and 18, and out of such engagement, as indicated by full lines in Figs. 2 and 4, and by dotted lines in Figs. 14, 15, and 17. K is an arm or lever fast on the cam or eccentric H, and by means of which the cam or eccentric can be easily turned to and fro, so as to move the fastening-strap C into and out of engagement with the lid-piece. M is a movable stop, arranged in connection with the cam or eccentric H, either directly, as in Figs. 17 and 18, or by its arm or lever K, as in Figs. 5, 15, and 16, in such manner that when the cam or eccentric is turned into the position where it engages the fastening-strap C with the lid-piece B, the stop M can then be readily moved and set either so as to leave the cam or eccentric free to be turned on the pivot I, or so as to retain the cam or eccentric, and thereby secure the fastening-strap in engagement with the lid-piece in opposition to the various blows and pressures to which the fastening is exposed in use on travelers' trunks, and without interfering with the pivot-connection of the fastening-strap C with the body part A and lid-piece B.

In the trunk-fastening represented by Figs. 1, 2, 3, 4, and 5 the stop M is the bolt J, Fig. 5, of a lock, which is on the rear side of the plate A, and secured thereto, and which is or may be of any well-known suitable construction, and operated, as usual, by means of a key inserted through a hole, r, in the plate. The arm K has a hinge-joint, q, and a catch or staple b, Figs. 5, 6, and 8; and whenever the cam or eccentric H is turned so as to engage the strap C with the lid-piece B, as shown in Figs. 1 and 3, the hinged end portion of the arm K can then be turned down so that the catch or staple b shall extend through the aperture c in the plate A, and then the locking-bolt J can be engaged with the catch or staple b in rear of the plate A, as shown in Fig. 5, so as to thereby lock fast the arm K with its cam or eccentric H, so as to surely retain the loop d of the strap C in close engagement with the stud f of the lid-piece; and, whenever the bolt J shall be withdrawn from the catch or staple b, the latter can then be turned out of the hole c in the plate, as indicated in dotted lines in Fig. 5, and the arm K, with the cam or eccentric H, can then be turned into the position shown in Figs. 2 and 4, so as to disengage the loop d from the stud f. By having a hinge-joint, h, in the strap C the upper part thereof can be turned forward of the stud f, as indicated by dotted lines in Fig. 4, so as to not interfere with the raising and lowering of the lid part, and without requiring the strap C to be turned to one side, as is necessary when the strap has no hinge-joint, and has a hook, e, as in Figs. 15 and 17, to engage with the stud f.

In order to securely connect together and pivot to the plate A the strap C, cam or eccentric H, and lever K, I generally prefer to make the socket g in the strap with a beveled rim, i, Fig. 7, and the cam or eccentric with a corresponding beveled rim, j, Figs. 9 and 10, and make the cap part L of the arm K of greater radial extent than, and fasten it to, the smaller side of the cam or eccentric in the socket of the strap by a screw or rivet bolt, m, and then pivot the thus connected strap C, cam or eccentric H, and lever-arm K to the plate A by the headed stud I, substantially as represented by Figs. 3, 4, 6, and 16.

In Fig. 14, the cam or eccentric H and its socket g in the strap C are shaped so that the strap may be moved in a straight line to and fro endwise, as if between fixed straight parallel guides, by turning the cam H, by its arm K, through a quarter of a circle, as indicated by full and dotted lines; and at the same time the cam H so fills the aperture g in the strap C that the latter can be turned sidewise to and fro on the cam as a pivot, if desired.

In Figs. 15 and 16 the stop M is a bolt, which extends through the arm K and into the strap C, so as to thereby prevent the turning of the eccentric in the strap when the hook e of the strap is engaged with the stud f of the lid-piece, as shown in full lines. This stop M may be split to expand, or may have a screw thereon to engage with corresponding female screws in the arm K and strap C; and it can, by means of its head, be withdrawn or screwed out of the strap C, so as to release the arm K and eccentric H, and allow the latter to be turned into the position shown by dotted lines in Fig. 15, so as to disengage the hook e of the strap from the stud f, as indicated by dotted lines at e'. By turning back the arm K its hook p and the hook e, by proper direction, will re-engage with the stud f, as shown in full lines in Fig. 15, and the cam H and its arm K can then be resecured by re-inserting the stop M into the strap C.

In Figs. 17 and 18 the strap C is shown in full lines engaged with the stud f of the lid-piece by the eccentric H, which is retained by the stop M that extends through a hole in the plate A, and into the socket l in the eccentric, and is secured to one end of a spring, n, which is in rear of, and fastened at its other end to, the body-plate. By inserting a suitable pin into the socket $l$ the stop M can be pressed back out of that socket, so as to release the eccentric H, which can then be turned by the pin into the position indicated by dotted lines at $o$, so as to thereby disengage the hook $e$ of the strap C from the stud $f$, as indicated by dotted lines. To re-engage the hook $e$ with the stud $f$ the eccentric H must be turned into its position shown in full lines, where the stop M will be pressed by the spring $n$ into the socket $l$, so as to secure the eccentric in that position.

By inspecting the trunk-fastening represented by Figs. 1, 2, 3, 4, and 5, and which embodies all the essential parts of this invention, and the fastenings shown by Figs. 15 and 16 and 17 and 18, and which embrace only a portion of the same invention, it will be observed in each case that the fastening-strap C is moved into and out of engagement with the lid-piece B by means of the cam or eccentric H; and that in securing the lid part to the body part of a trunk by means of the strap C and cam or eccentric H, the latter draws the lid part toward the body part with rapidly-increasing and, finally, very great, force; and that when the lid part is thus secured to the body part the strap C is then practically pivoted at one end to the lid-piece and at the other end to the body part by means of the pivoted cam or eccentric H, and with the latter in such a position that any lengthwise pull or strain on the strap C does not materially tend to turn the cam or eccentric, nor to bring strain upon or disengage the movable stop M when engaged with the cam or eccentric H either directly or through its arm K.

What I claim as my invention is—

1. In combination with the body-piece A and lid-piece B, the fastening-strap C, pivoted upon or by the cam or eccentric H, which is pivoted upon the said body-piece, and so as to turn in a plane substantially parallel to the latter, and thereby move the said fastening-strap into and out of engagement with the said lid-piece, substantially as described.

2. In combination with the body part A and lid-piece B, the fastening-strap C, mounted upon the cam or eccentric H, which is pivoted so as to turn upon the said body part, and thereby move the said fastening-strap into and out of engagement with the said lid-piece, and an adjustable stop, by which the said cam or eccentric is secured so as to retain the fastening-strap in engagement with the lid-piece, substantially as shown and described.

3. In combination with the body-plate A and lid-piece B, the fastening-strap C, mounted upon and movable by the cam or eccentric H, which is pivoted to the said body-plate, and has an arm, K, with a hinge-joint, $q$, and a staple or catch, $b$, the aperture $c$ in the body-plate, and the locking-bolt J in rear of that plate, all substantially as shown and specified.

4. The combination of the fastening-strap C, having a tapering socket, $i$, therein, the eccentric H having the tapering rim $j$ in the tapering socket, the arm K having a cap-piece of greater radial extent than, and secured to, the smaller side of the said eccentric, and the headed pivot-bolt I extending through the said cap-piece and eccentric, and secured to the part A, substantially as described.

In testimony whereof I hereunto set my hand this 1st day of March, 1875.

ISAAC W. VALANCE.

Witnesses:
   JNO. T. CARROLL,
   AUSTIN F. PARK.